United States Patent [19]
Arita et al.

[11] Patent Number: 5,699,219
[45] Date of Patent: Dec. 16, 1997

[54] GROUND FAULT CURRENT LIMITER AND METHOD OF LIMITING GROUND FAULT CURRENT

[75] Inventors: Hiroshi Arita, Mito; Junzo Kida, Hitachi; Yoshiaki Matsui, Hitachinaka; Tokio Yamagiwa, Hitachi; Shigeyuki Sugimoto, Kani; Sadanori Neo, Gifu-ken, all of Japan

[73] Assignees: Hitachi, Ltd., Tokyo; Chubu Electric Power Co., Inc., Aichi-ken, both of Japan

[21] Appl. No.: 441,928

[22] Filed: May 16, 1995

[30] Foreign Application Priority Data

May 19, 1994 [JP] Japan .................................. 6-105534

[51] Int. Cl.[6] ...................................... H02H 9/08
[52] U.S. Cl. .................................. 361/43; 361/58
[58] Field of Search ..................... 361/10, 11, 17, 361/20, 21, 43, 54, 58, 61, 62, 87, 93, 42, 78, 79, 82, 84, 85, 86; 307/102, 103, 105, 127, 327

[56] References Cited

U.S. PATENT DOCUMENTS 3,657,728  4/1972  Mitsui et al. ........................ 361/58
4,464,696  8/1984  Masui et al. ........................ 361/43

FOREIGN PATENT DOCUMENTS 57-193935  11/1982  Japan .................. H02H 9/08
62-7338     1/1987  Japan .................. H02H 9/08

Primary Examiner—Jeffrey A. Gaffin
Assistant Examiner—Donald W. Leja
Attorney, Agent, or Firm—Fay, Sharpe, Beall, Fagan, Minnich & McKee

[57] ABSTRACT

A ground fault current limiter, in which reactors are connected in series to a neutral point for compensating for capacitances to ground of a power switches capable of turning ON/OFF at a high speed are connected in parallel with respective reactors, occurrence of a ground fault is detected from a phase difference between a zero-phase sequence current and a zero-phase sequence voltage at time of sampling, an optimal compensation quantity of capacitances to ground is computed based on the zero-phase sequence current and the zero-phase sequence voltage at time of occurrence of a ground fault, and ON/OFF of the switches are controlled thereby to alter the reactor quantity so as to correspond to the compensation quantity.

14 Claims, 9 Drawing Sheets

GROUND FAULT CURRENT LIMITER AND METHOD OF LIMITING GROUND FAULT CURRENT

BACKGROUND OF THE INVENTION

1. Field of the Invention

The present invention relates to protection of a power system for feeding power from a power-station to a load such as a consumer, and more particularly to a ground fault current, limiter and a method of limiting a ground fault current, suitable for compensation for an arc-suppressing coil of a neutral grounding apparatus and a compensating reactor of a distribution system in the presence of a ground fault of an extra-high-tension power line.

2. Description of the Related Art

There is always a problem of ground faults in the supply of electric power. In particular, one line ground fault current has a tendency to increase in keeping with the installation of a distribution system in the form of underground cables and increase in the total span length Of a distribution line per distribution system in city centers currently, or due to the increase in the total capacity by a parallel operation of distribution transformers planned for the future, and it is desired to cope with such a situation.

A system of providing a variable reactor in a power line is well known for limiting a ground fault current. For example, an arc-suppressing reactor of an extra-high-tension system of 22 KV to 77 KV is connected between a neutral point of a main transformer and ground, and capacitances to ground occupying the greater part of a grounding current at ground fault occurrence are negated by reactance. When an arc-suppressing coil is used, a continuous compensation system is adopted having perfect compensation of capacitances to ground of the system as a target. Since a compensation value is set adapting to the span length of the transmission line, the reactor is suspended and manual change-over is performed in the existing circumstances when the system structure is changed.

Since much labor is required and it is impossible to cope with the change instantly by manual change-over, however, an apparatus for automating tap selection is proposed. For instance, a system for setting a tap position of a tap changer adapted to capacitances to ground corresponding to the system structure in advance, and selecting an optimal tap position based on switch information of a circuit breaker, is disclosed in JP-A-57-193936.

Further, a continuous compensation system is adopted on the assumption of insufficient compensation in the compensating reactor applied to a distribution line of a 6.6 KV system. The maximum value of charging current of capacitances to ground in the present distribution systems is approximately 20 A, and ground works for class 2 grounding in the Japanese Technical Standards for Electrical Installations are performed taking the above-mentioned point into consideration. The preservation of security is attempted by installing a ground fault protective device, and a current limiting resistor is made large for the purpose of securing a zero-phase sequence voltage at the ground fault occurrence.

As described above, a compensating reactor applied to a conventional power line such as a distribution system has a continuous compensation system on the assumption of insufficient compensation. The system always changes in the distribution system by automation or the like, but the compensation value cannot follow such a change, and optimization of compensation of capacitances of the distribution system has not been performed essentially. Namely, the optimum value of the reactor is different with respect to each distribution line, and also changes depending on the change of the system structure by daily system application. Therefore, a system in which the reactor can be altered appropriately is desired when optimization of ground fault current compensation is taken into consideration.

A method of changing over a tap of a compensating reactor is known as a method of adjusting a compensation degree of capacitances to ground. In a mechanical type, however, the response speed is on the order of minutes, and the change-over frequency cannot be increased. Therefore, in such adjustment of a compensating reactor made mechanically, it is impossible to cope with a ground fault immediately when the ground fault has occurred; and it takes time to cope with the ground fault. In other words, it is impossible to adjust following a ground fault. Thus, it is essentially the same as that the compensating reactor is made fixed in coping with the ground fault.

Further, as described above, one line ground fault current has a tendency to increase by formation of distribution systems in city centers into underground cables, increase in the total span length of the distribution line per distribution system, or increase of total capacities by parallel operation of distribution transformers for the future. When one line ground fault current is increased, such problems that a plurality of grounding resistances have to be provided in parallel for further making ground works for class 2 grounding in the Japanese Technical Standards for Electrical Installations lower in resistance, and that maintenance of detection sensitivity of a ground fault protective relay is required, are generated.

SUMMARY OF THE INVENTION

The present invention has been made in view of such actual circumstances of the prior art, and has for its object to aim at the improvement of the reliability of a protection system of a power system. It is another object to provide a ground fault current limiter capable of performing ground fault current limiting control immediately after a ground fault occurrence. It is still another object to provide a ground fault current limiter capable of maintaining the detection sensitivity of the ground fault protective relay. Further, it is still another object to provide a ground fault current limiter and a method of limiting the same that do not require to make ground works for class 2 grounding in the Japanese Technical Standards for Electrical Installations lower in resistance.

The above-mentioned objects can be achieved by providing, in a ground fault current limiter capable of altering a reactor quantity of a neutral grounding reactor for compensating capacitances to ground of a power system, current detecting means for detecting the current of a power line, ground fault detecting means for detecting the existence of a ground fault occurrence by a detected value detected by the current detecting means, and reactor quantity altering means for altering the reactor quantity based on the detected value when it is detected by the ground fault detecting means that the ground fault has occurred.

In this case, it is sufficient to have capacitances to ground compensated by the altered reactor quantity. It is desirable to arrange this compensation so that it may be made roughly by determining the reactor quantity ordinarily at a preset value lower than the value to be compensated completely, and a fixed reactor is used for instance as the means therefor.

Further, the reactor quantity altering means is structured so as to include control means capable of altering the reactor quantity rapidly when the ground fault detecting means detects a ground fault. Besides, when the reactor quantity is altered, the control means is set so as to obtain a phase difference from a zero-phase sequence current and a zero-phase sequence voltage and to compute the reactor quantity to be compensated from the phase difference. Further, it is recommended to structure the ground reactor by connecting a plurality of reactors in series and to structure the reactor quantity altering means of switch means provided in parallel with each reactor, and for connecting and/or disconnecting each reactor and control means for controlling connection and/or disconnection of the switch means. Besides, it is recommended to use a semiconductor switch such as a thyristor and a gate-turn-off (GTO) thyristor as the switch means.

Further, the above-mentioned objects are also achievable, in a method of limiting ground fault current by compensating capacitances to ground by means of a neutral grounding reactor, by setting a prefixed reactor quantity in the ground reactor so as to compensate capacitances to ground roughly at ordinary times, and compensating capacitances to ground by altering the reactor quantity with the roughly compensated reactor quantity in accordance to the ground fault current when a ground fault has occurred, thereby to limit the ground fault current.

According to the above-mentioned means, the ground fault detecting means detects the existence of a ground fault from the current flowing in the power line detected by the current detecting means, and the reactor quantity altering means alters the reactor quantity based on the detected value detected by the current detecting means after the ground fault has occurred in accordance with the result of detection. With this, the reactor quantity altering means is able to set to a more appropriate reactor quantity. In addition, it is possible to limit the ground fault current by setting the reactor quantity so as to compensate for capacitances to ground.

When the reactor quantity is determined normally to a preset value lower than the value to be compensated for completely so that compensation may be made roughly in compensating for the capacitances to ground, the maximum charging current of capacitances to ground is reduced. Therefore, when a ground fault has occurred, the reactor quantity is altered by the reactor quantity altering means so as to compensate for the portion that has not been compensated completely by rough compensation. Besides, when a plurality of reactors are connected in series with the ground reactor and switch means composed of semiconductor elements is connected to each reactor, it is possible to alter the reactor quantity at a high speed by controlling connection/disconnection of this switch means.

DESCRIPTION OF THE PREFERRED EMBODIMENTS

An embodiment of the present invention will be described hereinafter with reference to the drawings.

Figure 1:
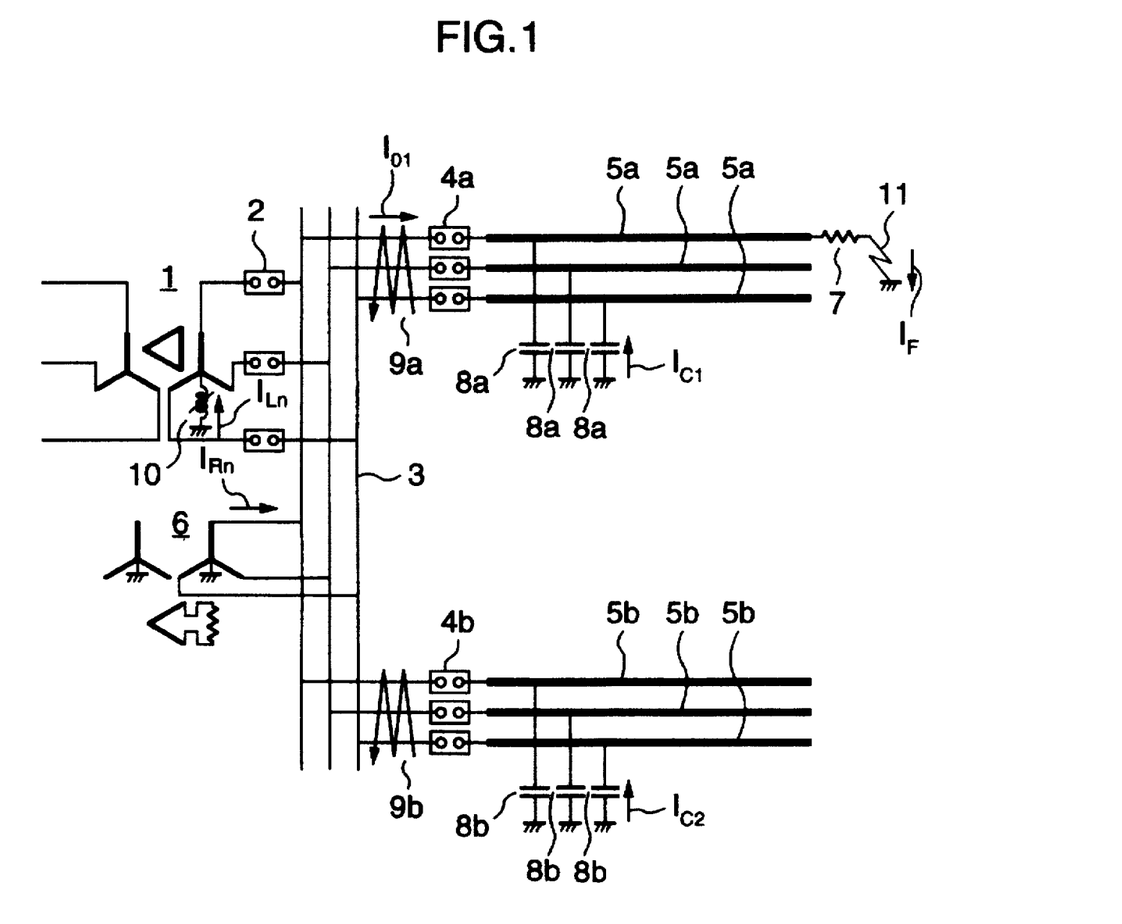
FIG. 1 is a circuit diagram showing a general structure of a ground fault current limiter according to an embodiment of the present invention.

FIG. 1 is a schematic diagram showing a state that a ground fault current limiter according to an embodiment of the present invention is installed in a power distribution system. The system shown in the figure is a general power distribution system. In FIG. 1, a distribution transformer 1 is connected to a bus 3 through circuit breakers 2, distribution lines 5a and 5b are connected to the bus 3 through circuit breakers 4a and 4b for distribution lines, and power is supplied to a load (not shown) through these distribution lines 5a and 5b. A grounding potential transformer (GPT) 6 is also connected also to the bus 3. In the figure, 7 represents grounding resistance at the fault point at ground fault occurrence, 8a and 8b capacitances to ground of the distribution lines 5a and 5b, and 9a and 9b zero-phase sequence current transformers (ZCT), respectively. In the power distribution system thus structured, a ground fault current limiter (hereinafter referred to also as "a ground fault current compensating unit") 10 having a variable reactor is connected in a star connection on the secondary side of the distribution transformer 1.

It is assumed that a ground fault, i.e., one line ground fault has occurred in the distribution line 5a in such a power distribution system. Then the fault current includes, as the components of $I_F$ of a ground fault current 11, a current $I_{C1}$ flowing through capacitances to ground 8a, of fault circuits 5a where the ground fault has occurred; a current $I_{C2}$ flowing through capacitances to ground 8b, of sound circuits 5b that are the sound circuits of the same bus; a current $I_{Rn}$ flowing in the grounding potential transformer 6; and a current $I_{Ln}$ flowing in the ground fault current compensating unit 10. The components of the zero-phase sequence current $I_{O1}$ of the fault circuit 5a are $I_{C2}$, $I_{Rn}$ and $I_{Ln}$.

Figure 2A:
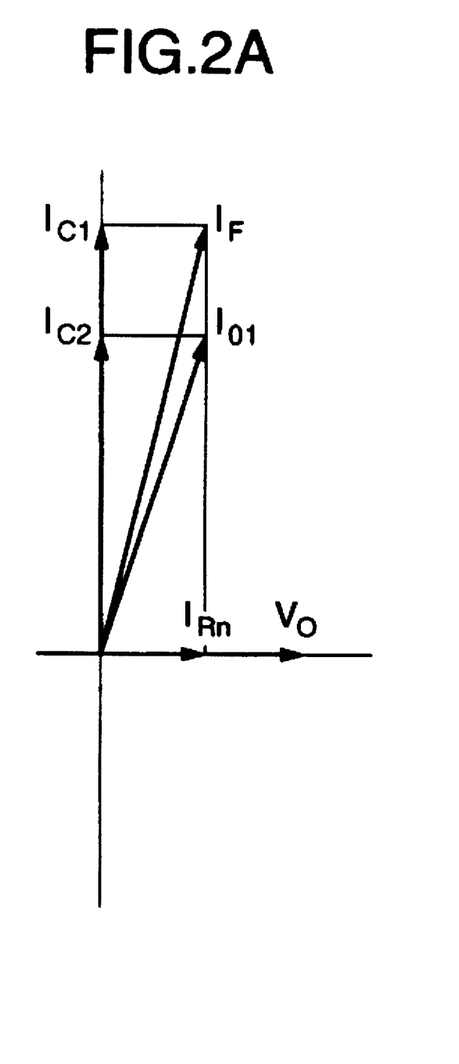
FIGS. 2A and 2B are explanatory diagrams for explaining a principle of limiting a ground fault current.
Figure 2B:
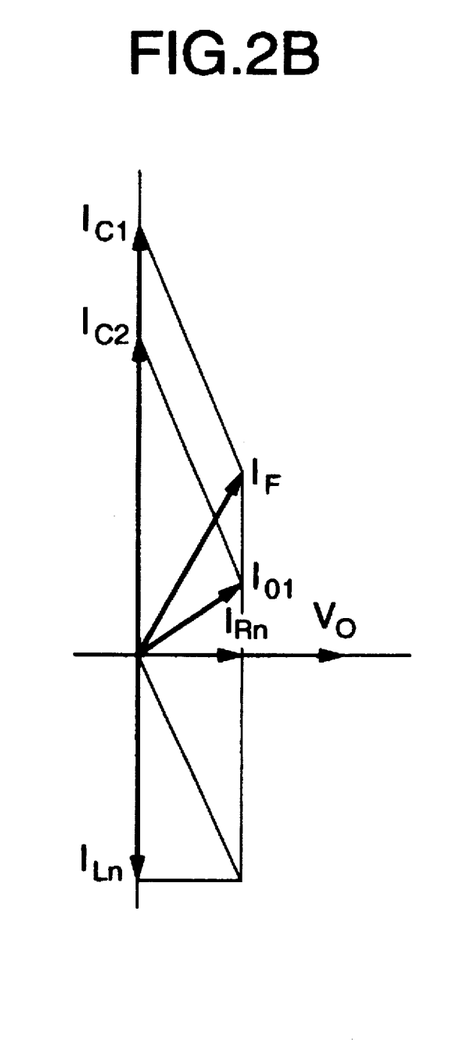

FIGS. 2A and 2B show a vector relationship of the ground fault current with the zero-phase sequence voltage in the grounding potential transformer 6 in the distribution system thus structured as a reference. When there is no ground fault current limiter 10, the ground fault current $I_F$ becomes a current obtained by composing the current components $I_{C1}$, $I_{C2}$ and $I_{Rn}$ of the zero-phase sequence current $I_{O1}$ of the fault circuit 5a. As against the above, when there is a ground fault current compensating unit 10, the ground fault current $I_F$ is limited because the current components $I_{C1}$ and $I_{C2}$ of the zero-phase sequence current $I_{O1}$ of the fault circuit 5a are negated by the current $I_{Ln}$ flowing in the ground fault current compensating unit 10.

The features of the operation of the ground fault current limiter in the present embodiment exist in that a reactor portion corresponding to approximate capacitance compensation is inserted from the beginning, the reactor compensation quantity is computed in the control unit from a zero-phase sequence voltage and a zero-phase sequence current when a fault occurs, and $I_{Ln}$ is varied at a high speed by adjusting the compensation quantity.

Figure 3:
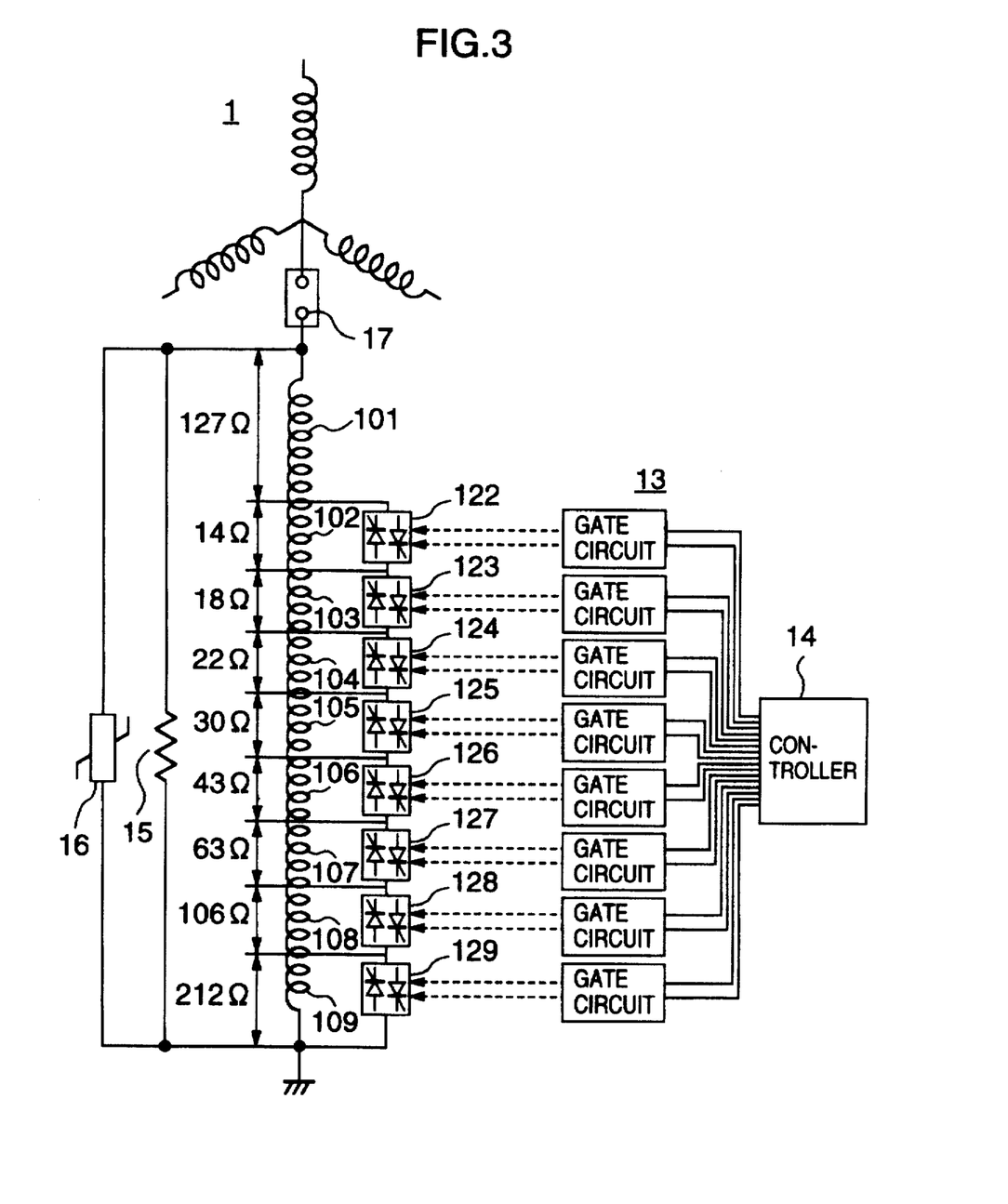
FIG. 3 is a circuit diagram showing a reactor and a principal part for altering a reactor quantity in a ground fault current limiter according to an embodiment of the invention.

FIG. 3 is a circuit diagram showing the structure of the ground fault current compensating unit 10 shown in FIG. 1. Here, this unit 10 is structured by connecting nine pieces of reactors 101, 102, 103, ..., 109 in series and semiconductor switches 122, 123, 124, ..., 129 capable of turning ON and OFF at a high speed in parallel to respective reactors. The reactor 101 is fixed and no semiconductor switch is connected in parallel therewith. The semiconductor switch is structured by connecting thyristors or GTO thyristors for instance in inverse-parallel with each other, and although it is not illustrated, there are provided an overvoltage limiting element, an anode reactor and a snubber circuit, respectively. Further, gate circuits 13 are connected to respective semiconductor switches 122, 123, 124, ..., 129, and the gate circuits 13 are connected to a control unit 14, respectively. Further, a resistance 15 for high resistance grounding and an overvoltage limiting element 16 of an isolated system are connected in parallel with the reactors 101, 102, 103, ..., 109, respectively. Further, the ground fault current compensating unit 10 is connected to the distribution transformer 1 through a switch 17 so that the whole ground fault current limiter may be isolated from the neutral point of the transformer 1.

When the structure is formed as described above, it is possible to put the reactors such as 101 to 106 that become approximate compensation from the actual results up to this time in the neutral point partially at the normal time, and to turn respective semiconductor switches 122, 123, ..., 129 ON/OFF by the signal from the gate circuits 13 following the instruction by the control unit 14 when a fault has occurred, thereby to limit the ground fault current at a high speed.

The foregoing will be described more concretely. When compensating reactors at intervals of 3 A are assumed in the case of the system voltage at 6.6 KV and the maximum charging current of capacitances to ground at 30 amperes (A), the impedance of the reactor 101 becomes 127 $\Omega$, which that corresponds to 30 A, and the impedance of the reactor 102 becomes 14 $\Omega$ (the finite difference from the reactor 101 since the total impedance becomes 141 $\Omega$ assuming the compensation quantity is 27 A). The values of respective reactors 103 to 109 can be determined in a similar manner thereafter. These determined values are 18 $\Omega$ for the reactor 103, 22 $\Omega$ for the reactor 104, 30 $\Omega$ for the reactor 105, 43 $\Omega$ for the reactor 106, 63 $\Omega$ for the reactor 107, 106 $\Omega$ for the reactor 108 and 212 $\Omega$ for the reactor 109 as shown the figure, too. Since reactor setting of insufficient compensation is made in general, the reactor equivalent to the compensation charging current of 27 A is to be used against the maximum charging current of capacitances to ground of 30 A. As a result, the semiconductor switch 122 is turned off, and other semiconductor switches 123 to 129 are brought into an on-state.

Figure 4:
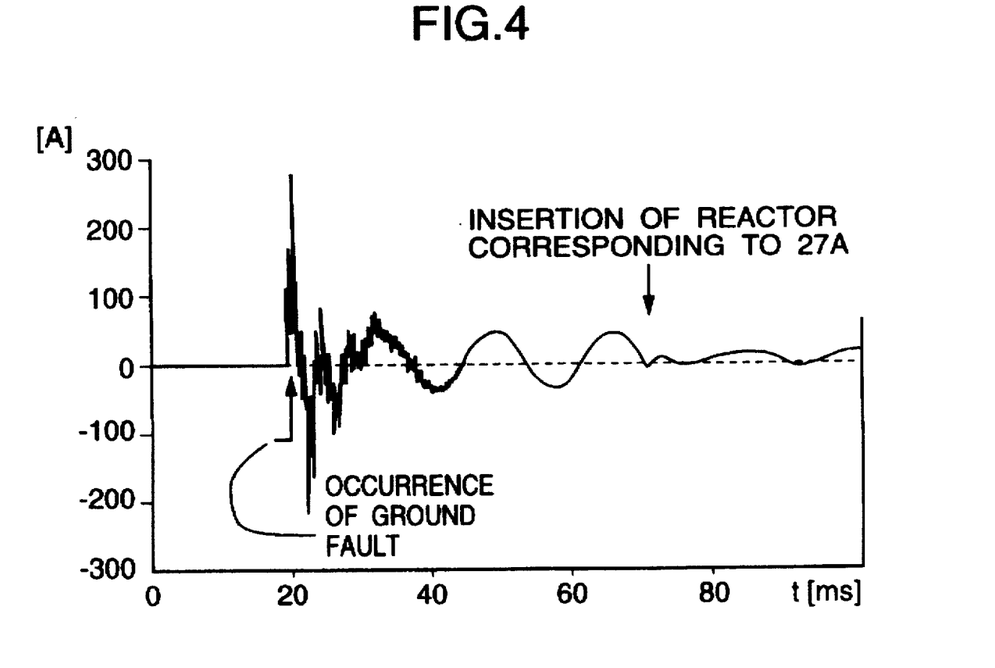
FIG. 4 is an analysis diagram showing a limiting effect in an embodiment of the invention.

FIG. 4 shows an analytical example when the ground fault current compensating unit 10 according to an embodiment is applied. It is shown that a current of 34 A in an effective value flows when a ground fault occurs, but that the ground fault current could be limited by a large margin by connecting the reactor equivalent to 27 A at a high speed. Further, a peak value of approximately 250 A is shown in the diagram immediately after a ground fault has occurred, but the period of time in approximately 10 ms from the time of ground fault occurrence is in a transient state.

Figure 5:
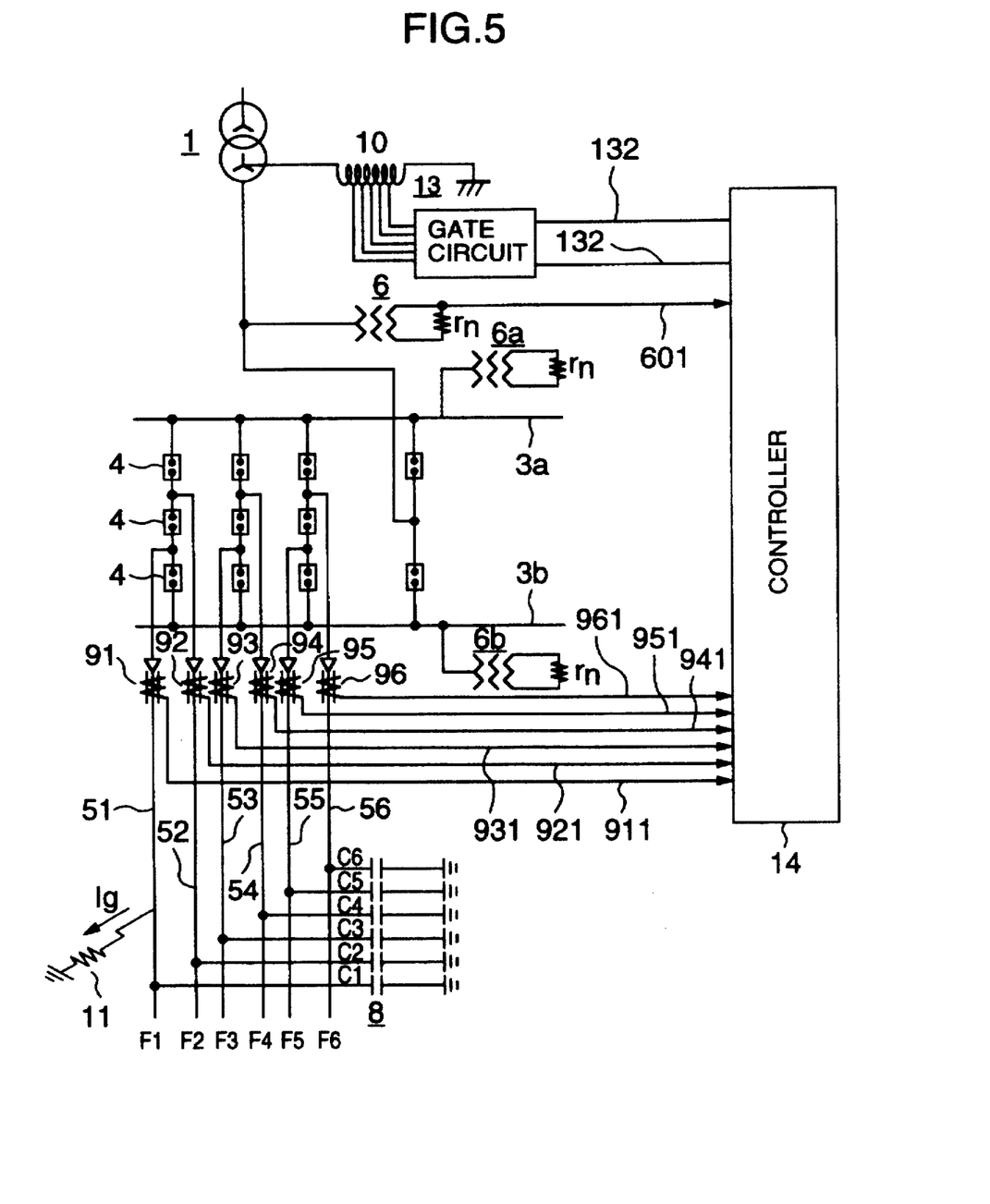
FIG. 5 is a system block diagram of a ground fault current limiter according to an embodiment of the invention.

FIG. 5 is a circuit diagram showing the general structure when the ground fault current limiter 10 according to an embodiment is applied to the system. The applied system is one that supplies electric power to a load through a distribution transformer 1, bus 3a and 3b, circuit breakers 4 and a plurality of distribution lines 51, 52, 53, 54, 55 and 56. Basically, it is structured of a main unit of the ground fault current limiter 10 and the control unit 14 thereof. Reference numerals 6, 6a and 6b represent grounding potential transformers, and a reference numeral 601 represents a transmission line from the grounding potential transformer 6 to the control unit 14. Further, zero-phase sequence current transformers 91, 92, 93, 94, 95 and 96 are connected to the distribution lines 51, 52, ..., 56 as shown in the figure, and are connected to the control unit 14 through transmission lines 911, 921, 931, 941, 951 and 961, respectively. Further, a reference numeral 8 represents capacitances to ground ($C_1$, $C_2$, $C_3$, $C_4$, $C_5$, $C_6$) of respective distribution lines 51 to 56. The signals of the zero-phase sequence current and the zero-phase sequence voltage detected by the zero-phase sequence current transformers (ZCTs) 91 to 96 and the grounding potential transformer 6 are inputted to the control unit 14 through the transmission lines 911, 921 to 961 and 601, and output instructions (ON/OFF signals) after computation are transmitted to the gate drive circuit 13 of the semiconductor switches 122 to 129 through a transmission line 132.

Although, a case that the ground fault current limiter 10 is connected to the neutral point on the secondary side of the distribution transformer 1 has been shown in the example in FIG. 5, similar effects in limiting the ground fault current are obtainable when it is connected to a neutral point on the primary side of the grounding potential transformer 6 or into a tertiary winding, or even when an exclusive grounding transformer is employed.

Figure 6:
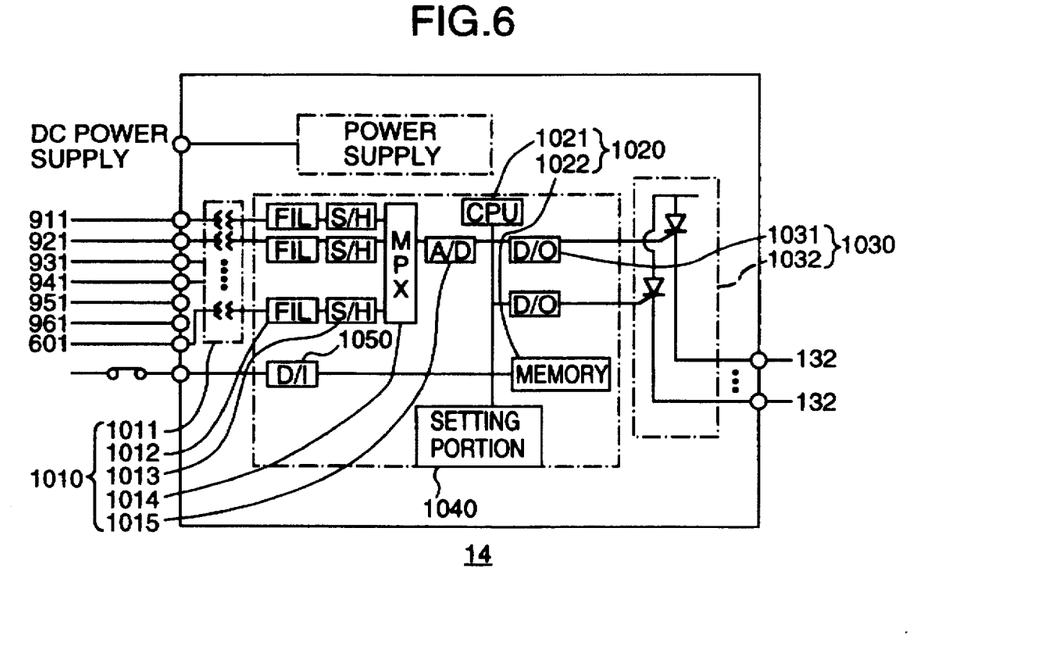
FIG. 6 is a block diagram showing the structure of the control unit shown in FIG. 5.

FIG. 6 is a block diagram showing a structure of the control unit 14 realized with the embodiment of FIG. 6. The control unit is formed of an input portion 1010 for sampling analog quantities of current and voltage and converting them into digital values, a processing portion 1020 for executing protective relay arithmetic processing based on input data, an output portion 1030 for transmitting control instructions to the ground fault current limiter 10 from the result of processing, a setting portion 1040 for executing setting operations and so on. The structures and functions of these portions 1010, 1020, and 1030 are shown hereunder.

The zero-phase sequence current signals and the zero-phase sequence voltages of respective distribution lines 51 to 56 are inputted to the input portion 1010 through the transmission lines 911–961 and 601, converted into digital signals, and inputted to the processing portion 1020 through an input transformer unit 1011, a filter portion (FIL) 1012, a sample/hold portion (S/H) 1013, a multiplexer circuit (MPX) 1014 for transmitting sampled-held data successively and an analog/digital conversion circuit (A/D) 1015. The processing portion 1020 is formed of a central processing unit (CPU) 1021 and a memory 1022 for storing a relay computing program, a computation result or the like.

A phase difference is obtained from the zero-phase sequence current and the zero-phase sequence voltage of the digital input signal sampled by the CPU 1021, the control quantity of the reactor is calculated from the phase difference when the ground fault has occurred, and increase or decrease of the reactor tap is decided. Further, the decided result is transmitted to the output portion 1030 as an ON/OFF signal. The output portion 1030 is formed of a digital output (D/O) 1031 and an auxiliary relay unit 1032, and transmits the ON/OFF signal of the decided result to the gate circuit 13 for controlling the semiconductor switches 122 to 129 through the transmission line 132. D/I 1050 represents the digital input for receiving an external signal. With this, it is possible to control the ground fault current limiter 10 at a high speed by means of the arithmetic type control unit 14. The processing in the CPU 1021 shown in FIG. 6 will be described later.

Figure 7:
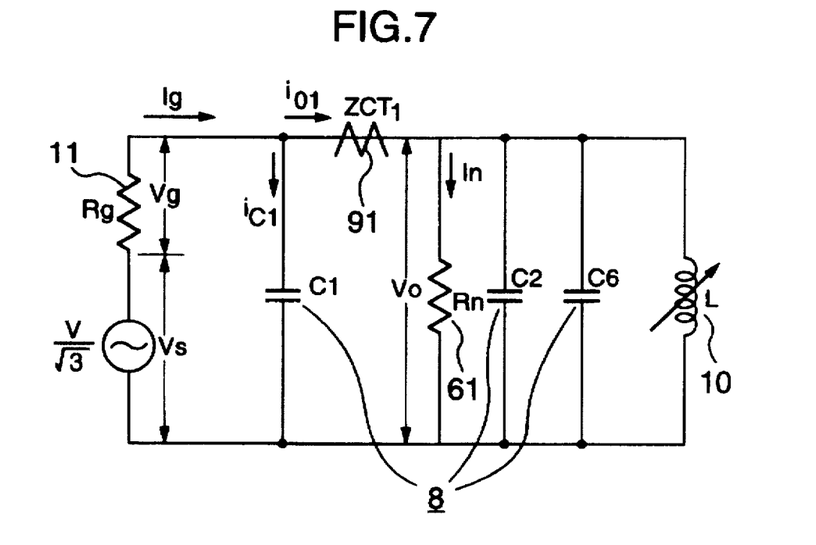
FIG. 7 is an equivalent circuit diagram of FIG. 5 when one line ground fault has occurred.

FIG. 7 is a circuit diagram showing an equivalent circuit when one line ground fault has occurred in the distribution line 51 shown in FIG. 5. Constructed as illustrated in this figure, it is possible to control the voltage rise on the lower voltage side when high and low voltages exist in a mixed manner as the effect of the ground fault current limiter 10. Namely, it is possible to control the compensating reactor variably at a high speed so as to suppress $V_g$ (that is, the voltage across both ends of $R_g$ of the portion where the ground fault has occurred). A reference numeral 61 represents a linearly transformed resistance $R_n$ of current limiting resistor $r_n$ in the tertiary winding of a grounding potential transformer (GPT) 6. When the power supply voltage $V_s$, the zero-phase sequence voltage $V_0$ and the voltage $V_g$ across the ends of the portion where the ground fault has occurred are expressed with vectors (vectors are shown with underlines in the following expression), $$V_s = V_0 + V_g \quad (1)$$

is obtained from the equivalent circuit shown in FIG. 7. Since the power supply voltage $V_s$ is constant, it is possible to minimize the voltage $|V_g|$ across the ends of the portion where the ground fault has occurred when the zero-phase sequence voltage $|V_0|$ is controlled to become the maximum. Namely, $$V_0 = (V/\sqrt{3})/[1 + R_g\{1/R_n + j\omega C + 1/j\omega L\}] \quad (2)$$

Since $C = C_1 + C_2 + C_3 + C_4 + C_5 + C_6$, when the compensating reactor L is controlled so as to effect, $$\omega C = 1/\omega L \quad (3)$$

the following equations are obtained;

$$V_0 = (V/\sqrt{3})\{R_n/(R_n + R_g)\} \quad (4)$$

$$\begin{aligned}
V_g &= V_s - V_0 \\
&= V/\sqrt{3} - (V/\sqrt{3})\{R_n/(R_n + R_g)\} \\
&= (V/\sqrt{3})\{R_g/(R_n + R_g)\}
\end{aligned} \quad (5)$$

and $I_g$ is in-phase with $V_0$. However, since a current $I_{01}$ flowing in $ZCT_1$ of the zero-phase sequence current transformer 91 is a current obtained by subtracting a leading current $i_{C1}$ on $V_0$ from $I_g$, it shows a lagging phase on $V_0$. As a result, although it is not shown, the distribution line ground fault protective relay (directional ground) makes a decision within a lagging phase range.

From the foregoing, two control systems, a zero-phase sequence voltage maximum control system and a zero-phase sequence voltage and a zero-phase sequence current in-phase control system, are conceivable from the relationship with the ground fault protective relay (directional ground).

(a) Zero-phase sequence voltage ($V_0$) maximum control system

This system is one for controlling the compensating reactor so that the zero-phase sequence voltage $V_0$ becomes the maximum at that time of a one line ground fault, paying attention to the zero-phase sequence voltage $V_0$. Namely, since the voltage rise on the low voltage side becomes:

$$3810\{R_g/(R_n + R_g)\} \quad [V]$$

from the equation (5), the grounding resistance is prescribed by $R_n$ only, thus producing an effect of limiting the ground fault current completely without what is called a "compensation remainder".

Figure 8:
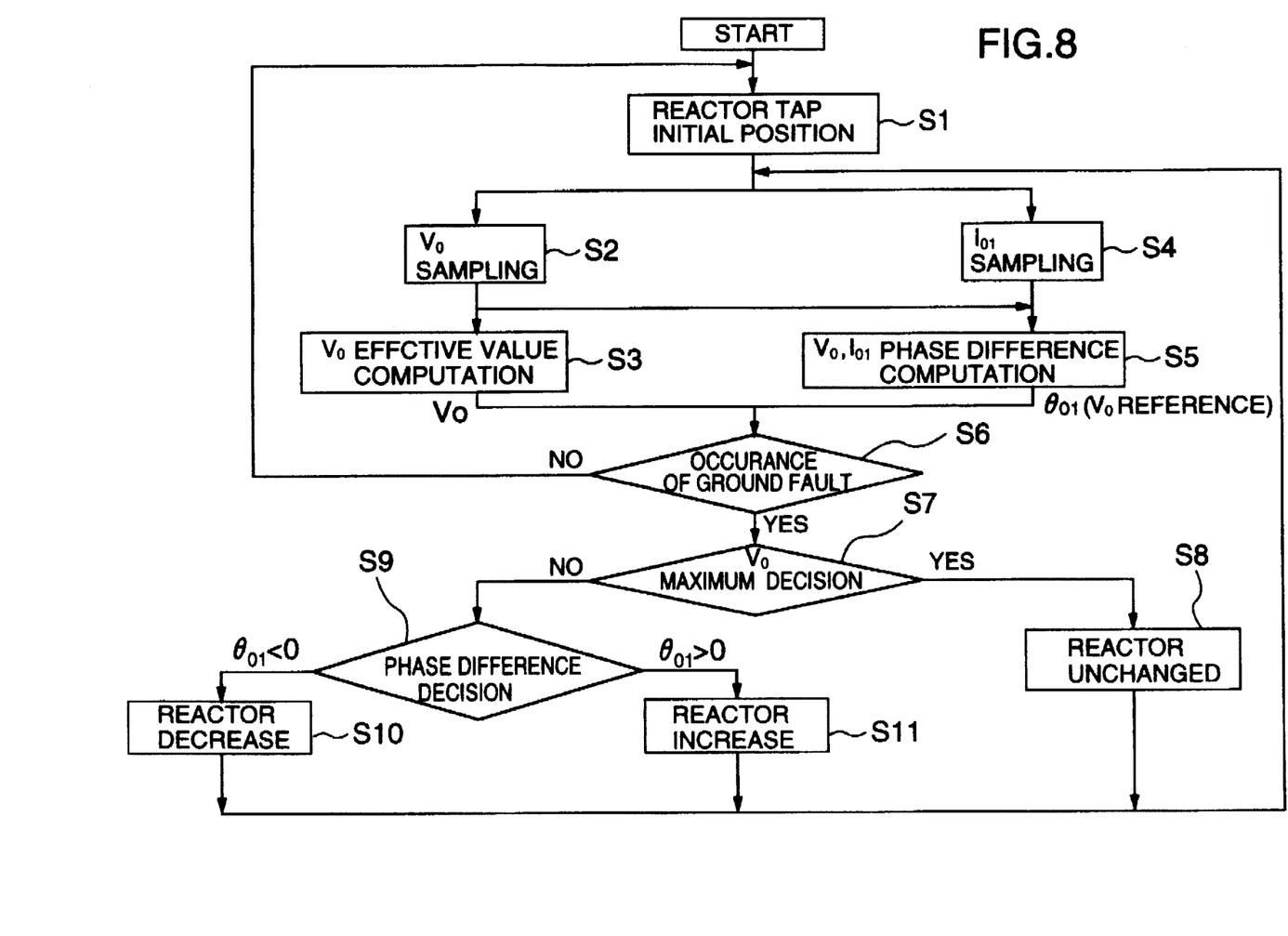
FIG. 8 is a flowchart showing a control process in the zero-phase sequence voltage maximum control system.

A flowchart showing the control procedure in the CPU 1021 at this time is shown in FIG. 8.

In this control, an initial position of a reactor tap before the fault is determined first (step S1). For example, the initial position is set to approximately 50% of the maximum capacitance to ground. Normally, the effective value is computed from the sampled zero-phase sequence voltage $V_0$ (steps S2 and S3), and a phase difference $\theta_{01}$ is computed from the zero-phase sequence voltage $V_0$ and the zero-phase sequence current $I_0$ at almost the same time (steps S4 and S5). Then, occurrence of a ground fault is decided by comparing with a set value at a normal time (step S6). When it is found in this decision that no ground fault has occurred, the process is returned to the step S1, and computation is repeated. If a ground fault has occurred, the maximum decision of the zero-phase sequence voltage $V_0$ is executed, the reactor tap is not altered in the case of the maximum (step S8), but the process is returned to the step S2 and the step S4 and the processing thereafter is executed. If the zero-phase sequence voltage $V_0$ is not the maximum, the phase difference decision is executed (step S9), the position of the reactor tap is reduced so as to reduce the reactor quantity when the phase difference $\theta_{01}$ is negative (step S10), the reactor tap position is increased so as to increase the reactor quantity when the phase difference $\theta_{01}$ is positive (step S11), and the process is returned to the step S2 and the step S4 and the processing thereafter is executed.

Since the directional ground relay used in this system gives a decision in a lagging or delay phase range of a zero-phase sequence current against zero-phase sequence voltage, the detection characteristics are set so that the zero-phase sequence current transformer (ZCT) current is operated within the range from the in-phase to the lagging phase on the tertiary voltage of the grounding potential transformer (GPT). The fault circuit is determined by identifying the ground fault direction on the basis of the zero-phase sequence voltage and zero-phase sequence current of the zero-phase sequence current transformer (ZCT) of each distribution line. If a distribution line in which the only direction is reverse is cut off as a fault circuit, the fault can be removed. Thus, an effect as a ground fault current limiter system can be obtained.

(b) Zero-phase sequence voltage ($V_0$) and zero-phase sequence current (ZCT current $I_0$) in-phase control system This system is one for controlling the compensating reactor so that the zero-phase sequence voltage $V_0$ and the zero-phase sequence current $i_0$ become in-phase at the time of a one line ground fault paying attention to both the zero-phase sequence voltage $V_0$ and the zero-phase sequence current (ZCT current) $I_0$. Since the zero-phase sequence voltage $V_0$ and the zero-phase sequence current $I_0$ become in-phase to each other in this system, the ground directional relay may have the characteristics of leading phase decision, but what is called "compensation remainder" is produced. Namely, since the following equation:

$$(C-C_1)=1/\omega L \tag{6}$$

is effected from a condition that the zero-phase sequence voltage $V_0$ and the zero-phase sequence current $I_0$ are in-phase to each other, the current $I_g$ at the fault point is shown by the following equation.

$$I_g = (V/\sqrt{3})\{(1/R_n)+j\omega C_1\}/(1+R_g(1/R_n+j\omega C_1)) \tag{7}$$

The voltage rise $V_g$ on the lower voltage side is shown with the following equation.

$$|V_g| = |I_g| \cdot R_g \tag{8}$$
$$= |V|/\sqrt{3} | \cdot \sqrt{\{(R_g/R_n)^2+(\omega C_1 R_g)^2\}} / \sqrt{\{(1+R_g/R_n)^2+(\omega C_1 R_g)^2\}}$$

Figure 9:
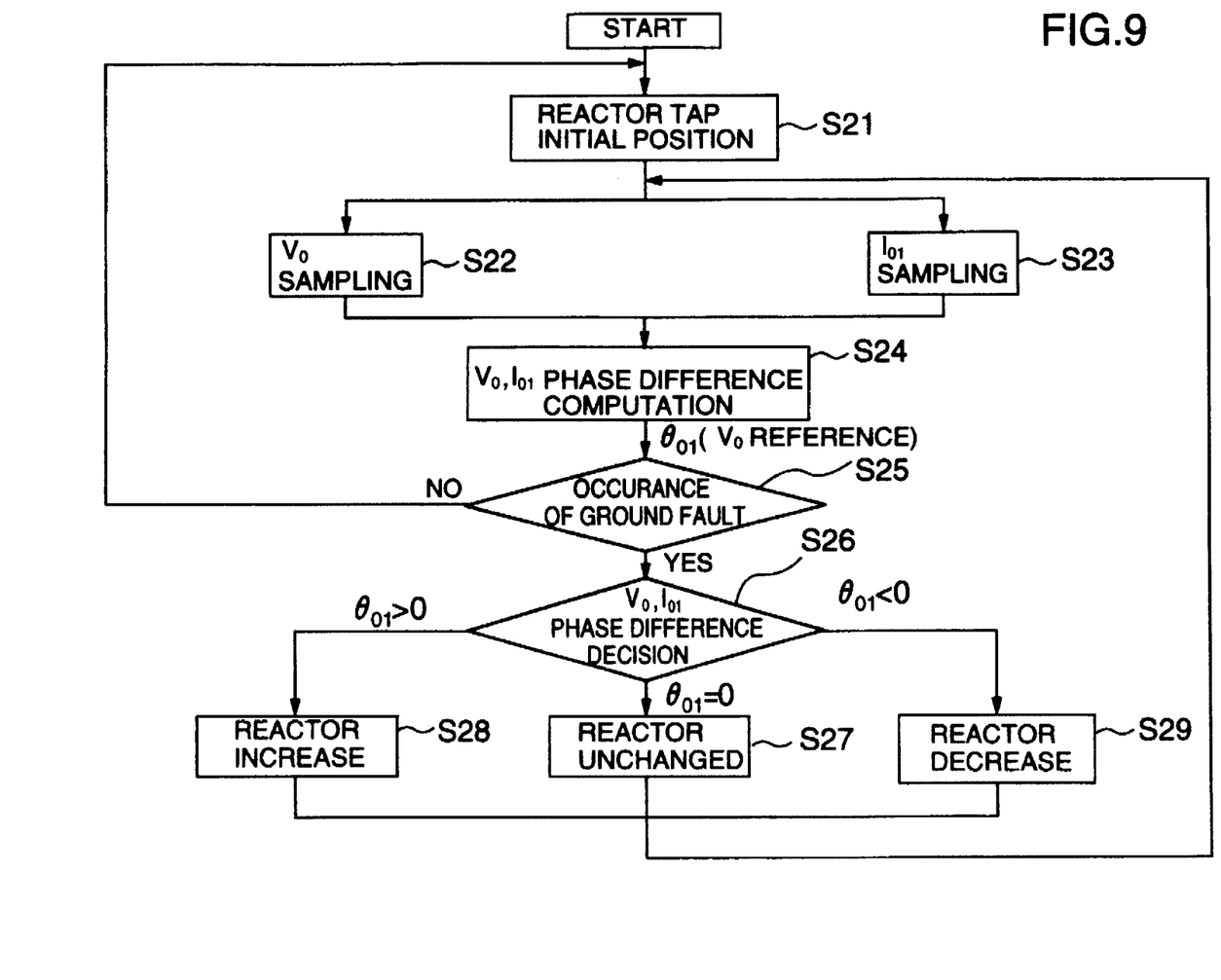
FIG. 9 is a flowchart showing a control process in the in-phase control system between a zero-phase sequence voltage and a zero-phase sequence current.
Figure 10:
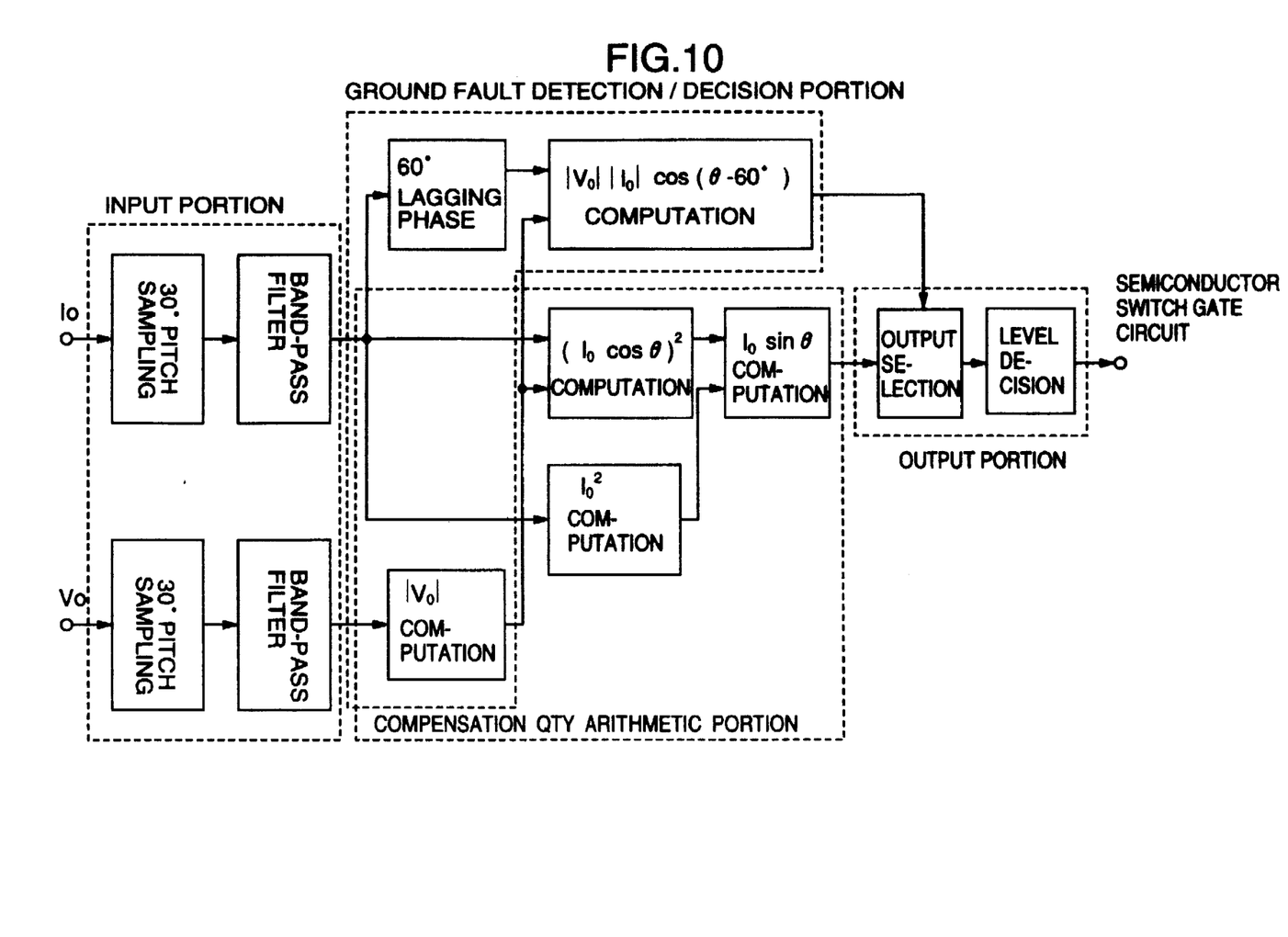
FIG. 10 shows a detailed control processing procedure of the in-phase control means between a zero-phase sequence voltage and a zero-phase sequence current.

The control procedure of the CPU 1021 in this system is shown with a flowchart shown in FIG. 9. In this control, the initial position of the reactor tap before the fault is determined first (step S21). Normally, a phase difference $\theta_{01}$ is computed in step S24 from the sampled zero-phase sequence voltage $V_0$ (step S22) and the sampled zero-phase sequence current $I_0$ (step S23). Then, the occurrence of a ground fault is decided by comparing with a set value at a normal time (step S25). When it is found in this decision that no ground fault has occurred, the process is returned to the step S21 and the operation is repeated. If it is decided that a ground fault has occurred, the phase difference $\theta_{01}$ between the zero-phase sequence voltage $V_0$ and the zero-phase sequence current $I_0$ is decided (step S26), the reactor tap is not changed when in-phase of approximately $\theta_{01}=0$ (step S27), the reactor tap position is increased so as to increase the reactor quantity when the phase difference is found in the decision and $\theta_{01}$ is positive (step S28), the reactor tap position is reduced so as to reduce the reactor quantity when $\theta_{01}$ is negative (step S29), and the processing in the steps S22 and S23 and thereafter is repeated.

FIG. 9 is a control block diagram of a control unit of a ground fault current limiting system in which a further detailed in-phase control system of the zero-phase sequence voltage and the zero-phase sequence current has been adopted. In the input portion, fundamental wave components (60 [Hz]) of the zero-phase sequence voltage $V_0$ and the zero-phase sequence current $I_0$ having a phase difference $\theta$ are sampled, and the effective value is computed digitally. In a ground fault detection and direction decision portion, a fault feeder is decided by performing fault detection by the size of the inner product of $V_0$ and $I_0$ with a 60° lagging phase of the zero-phase sequence current $I_0$ as the center, and decision on the inside and the outside on the fault depending on positive and negative of the inner product with respect to every feeder. In the compensation quantity arithmetic portion, sin components of the zero-phase sequence current $I_0$ corresponding to the capacitive components of the ground fault current (=charging current of capacitances to ground) are computed and outputted. In the output portion, only the result of computation of the compensation quantity of the feeder where the ground fault has occurred is selected and outputted, and the tap of the semiconductor switch to be closed is selected by level decision, thereby to make ON/OFF control. According to this control method, the control is made so that the zero-phase sequence voltage $V_0$ and the zero-phase sequence current $I_0$ become in-phase to each other when the compensating reactor is connected.

A distribution system has been described as an object in the above-mentioned embodiment, but similar effects of limiting ground fault current are obtainable even when the present invention is applied to a system in which an arc-suppressing reactor of a power line of an extra-high-tension system is connected between a neutral point of the main transformer and the ground, and capacitive components occupy the greater part of the ground current at the time of a transmission line fault by reactance. Since it is assumed to compensate for the capacitances to ground of the system completely when an arc-suppressing reactor is used, it is recommendable to apply the zero-phase sequence voltage maximum control system described previously.

As is apparent from the description up to this point, according to the present invention, the compensating reactor is altered in accordance with the current flowing in a distribution line when a ground fault occurs. Therefore, it is possible to control a ground fault current with higher accuracy, thus aiming at improvement of reliability of a power protective system. Further, since the compensating reactor can be varied at a high speed, it is possible to limit the ground fault current at time of ground fault at a high speed. With this, it is possible to prevent lowering of the detection sensitivity of the ground fault protective relay. Further, it becomes unnecessary to perform achievement of lower resistance of class 2 grounding set forth in the Japanese Technical Standards for Electrical Installations, thus making it possible to cope with an increase in the total span length of the distribution line and parallel operation of distribution transformers.

To be more concrete, according to the present invention, since the reactor quantity is altered based on the detected value detected by the ground fault detecting means after the ground fault has occurred, it becomes possible to alter the reactor quantity corresponding to the ground fault, and to aim at improvement of reliability of the protective system of the power system.

According to the present invention, since capacitances to ground are compensated for by altering the reactor quantity as described above, it becomes possible to limit the ground fault current, and it becomes unnecessary to achieve further lower resistance in class 2 grounding set forth in the Japanese Technical Standards for Electrical Installations.

Further, according to an apparatus of the present invention, since it becomes possible to provide means for normally prescribing the ground reactor quantity to a preset value lower than the value at which the capacitances to ground are compensated for completely, it becomes possible to compensate for the ground reactor quantity roughly while setting the capacitances to ground to a preset value lower than a value that can be compensated for completely, thereby to suppress the maximum charging current of capacitances to ground, thus producing such an effect that the control quantity of the reactor quantity when the ground fault has occurred is made smaller and correspondence can be made rapidly for that portion.

Further, according to the present invention, since a preset value lower than the value at which the capacitances to ground can be compensated for completely is provided, it becomes possible to structure an apparatus of the present invention at a low cost by providing a fixed reactor.

Moreover, in the apparatus of the present invention, the ground fault detecting means becomes capable of detecting the occurrence of a ground fault simply from the sampled zero-phase sequence voltage and zero-phase sequence current.

Further, according to the apparatus of the present invention, since it is structured including control means capable of varying the reactor quantity rapidly, it is possible to control the ground fault current low, corresponding quickly to the occurrence of a ground fault.

Further, the reactor quantity control means of the present invention decides the maximum value of the zero-phase sequence voltage, increases or decreases the reactor quantity depending on the direction of a phase difference between the zero-phase sequence voltage and the zero-phase sequence current when it is not at the maximum, and furthermore, compares the phase difference between the zero-phase sequence voltage and the zero-phase sequence current and increases or decreases the reactor quantity depending on the direction of the phase difference when they are not in-phase to each other. Thus, operation with high accuracy at a high speed becomes possible, and compensation accuracy of capacitances to ground of the reactor quantity is improved.

Further, according to the present invention, since connection/disconnection of the reactor are performed individually through control means and switch means, it is possible to control rapidly in accordance with the reactor quantity to be altered, and to control the ground fault current low, coping with the occurrence of a ground fault quickly.

Further, according to the present invention, since the switch means is formed of a semiconductor switch, it is possible to make change-over control at a high speed and with certainty.

We claim:

1. A ground fault current limiter capable of limiting a ground fault current of a power system by adjusting a reactor quantity of a neutral ground reactor for compensating for capacitances to ground of a power system, comprising:

zero-phase sequence current detecting means for detecting a zero-phase sequence current of said power system;

zero-phase sequence voltage detecting means for detecting a zero-phase sequence voltage of said power system;

ground fault detecting means for detecting an occurrence of a ground fault of said power system from a zero-phase sequence current value detected by said zero-phase sequence current detecting means and a zero-phase sequence voltage value detected by said zero-phase sequence voltage detecting means;

compensation reactor quantity calculation means for calculating a reactor quantity for compensation from said zero-phase sequence current value and said zero-phase sequence voltage value; and reactor quantity control means for controlling said reactor quantity according to the compensation reactor quantity calculated by said compensation reactor quantity calculation means, when said ground fault detecting means has detected an occurrence of a ground fault of said power system.

2. A ground fault current limiter according to claim 1, further comprising means for setting said ground reactor quantity to a preset value lower than a value at which capacitances to ground are compensated for completely.

3. A ground fault current limiter according to claim 2, wherein said means for setting said preset value is composed of a fixed reactor.

4. A ground fault current limiter according to claim 1, wherein said ground fault detecting means detects existence of occurrence of a ground fault based on a phase difference between said sampled zero-phase sequence voltage and said zero-phase sequence current.

5. A ground fault current limiter according to claim 1, wherein said ground fault detecting means detects existence of occurrence of a ground fault by comparing a phase difference between said zero-phase sequence voltage and said zero-phase sequence current with a set value.

6. A ground fault current limiter according to claim 1, wherein said reactor quantity control means is structured including altering means capable of altering the reactor quantity rapidly when the ground fault detecting means detects a ground fault.

7. A ground fault current limiter according to claim 6, wherein said altering means obtains a phase difference from the zero-phase sequence current and the zero-phase sequence voltage, computes a reactor quantity to be compensated for from this phase difference, and alters the reactor quantity.

8. A ground fault current limiter according to claim 7, wherein said altering means decides a voltage value of the zero-phase sequence voltage, and increases or decreases the reactor quantity in accordance with a positive or negative state of said zero-phase sequence phase difference so that said voltage becomes the maximum.

9. A ground fault current limiter according to claim 7, wherein said altering means compares the phase difference between the zero-phase sequence voltage and the zero-phase sequence current with a set value, and increases or decreases the reactor quantity in accordance with a positive or negative state of said phase difference when the zero-phase sequence voltage and the zero-phase sequence current are not in-phase with each other.

10. A ground fault current limiter according to claim 1, wherein said ground reactor is formed by connecting a plurality of reactors in series, and wherein the ground fault current limiter further comprises a plurality of reactor quantity control means provided in parallel with a respective one of said reactors, and a plurality of switch means for performing connection/disconnection of respective reactors and means for controlling ON/OFF of the plurality of switch means.

11. A ground fault current limiter according to claim 10, wherein each of said switch means is composed of a semiconductor switch.

12. A ground fault current limiter according to claim 1, wherein said power system is a distribution system.

13. A ground fault current limiter according to claim 1, wherein said power system is an extra-high-tension system.

14. A method of limiting a ground fault current by compensating for capacitances to ground of a power system by means of a neutral ground reactor, characterized in that a reactor quantity is preset to said ground reactor so as to roughly compensate for capacitances to ground, a compensation reactor quantity in accordance with a zero-phase sequence current and a zero-phase sequence voltage of said power system is computed when a ground fault has occurred, and capacitances to ground are compensated for by altering the present reactor quantity based on the result of computation.

* * * * *